May 22, 1945. E. W. COLE 2,376,419
STEERABLE FRONT WHEEL DRIVE TRACTOR
Filed July 20, 1944 4 Sheets-Sheet 1

INVENTOR.
E.W. COLE
BY
ATTY

May 22, 1945.  E. W. COLE  2,376,419
STEERABLE FRONT WHEEL DRIVE TRACTOR
Filed July 20, 1944  4 Sheets-Sheet 3

INVENTOR.
E.W. COLE
BY
ATTY.

May 22, 1945.  E. W. COLE  2,376,419
STEERABLE FRONT WHEEL DRIVE TRACTOR
Filed July 20, 1944  4 Sheets-Sheet 4

INVENTOR.
E. W. COLE
BY
ATTY.

Patented May 22, 1945

2,376,419

UNITED STATES PATENT OFFICE 2,376,419

STEERABLE FRONT WHEEL DRIVE TRACTOR

Emory W. Cole, Alto, Tex.

Application July 20, 1944, Serial No. 545,771

5 Claims. (Cl. 180—43)

This invention relates to steerable front wheel drive units or assemblies, and more particularly to such units as applied to farm tractors as commonly used for plowing and cultivation of land.

One main object of the invention is to provide a type of farm tractor of the kind referred to, compact in form and construction and efficient in operation, the same being equipped with steerable front drive or traction wheels, whereby the tractive power of the machine is advanced from the rear axle to the front axle, thus affording a more positive and accurate alignment of the plows with the work in hand, such as in the cultivation of row crops or similar kinds of work.

Another object of the invention is to provide a plow tractor, driven by power applied to the front axle and drive shaft thereof, the said power being transmitted from the drive shaft to the steerable front wheels, and the assembly including a gang of plows supported medially of the chassis forwardly of and in plain view of the operator as seated at the rear of the chassis, by which arrangement the operator may easily view and guide the plows closely and accurately along the crop rows.

Other objects and advantages of the invention will appear from a perusal of the specification, and reference to the accompanying drawings, wherein is exemplified a preferred embodiment of the invention, and wherein.

Figure 1:
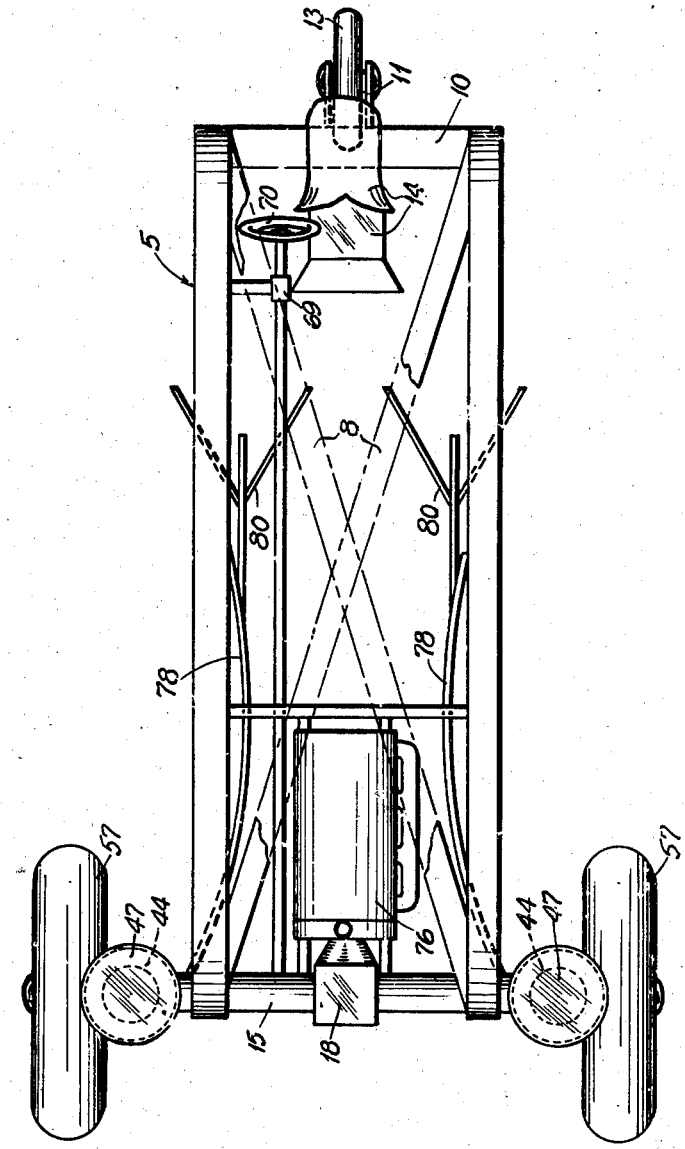
Figure 1 is a top plan view of a farm or plow tractor as constructed in accordance with this invention.
Figure 2:
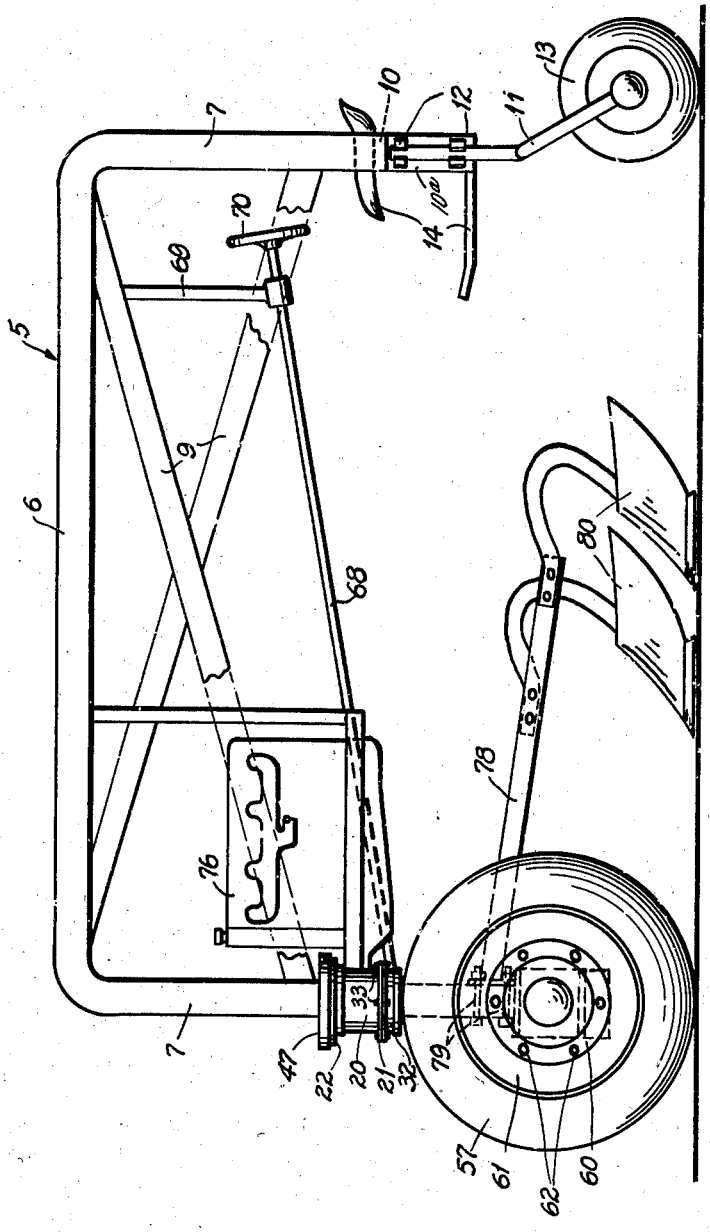
Figure 2 is a side elevation of the assembly shown in Figure 1.
Figure 3:
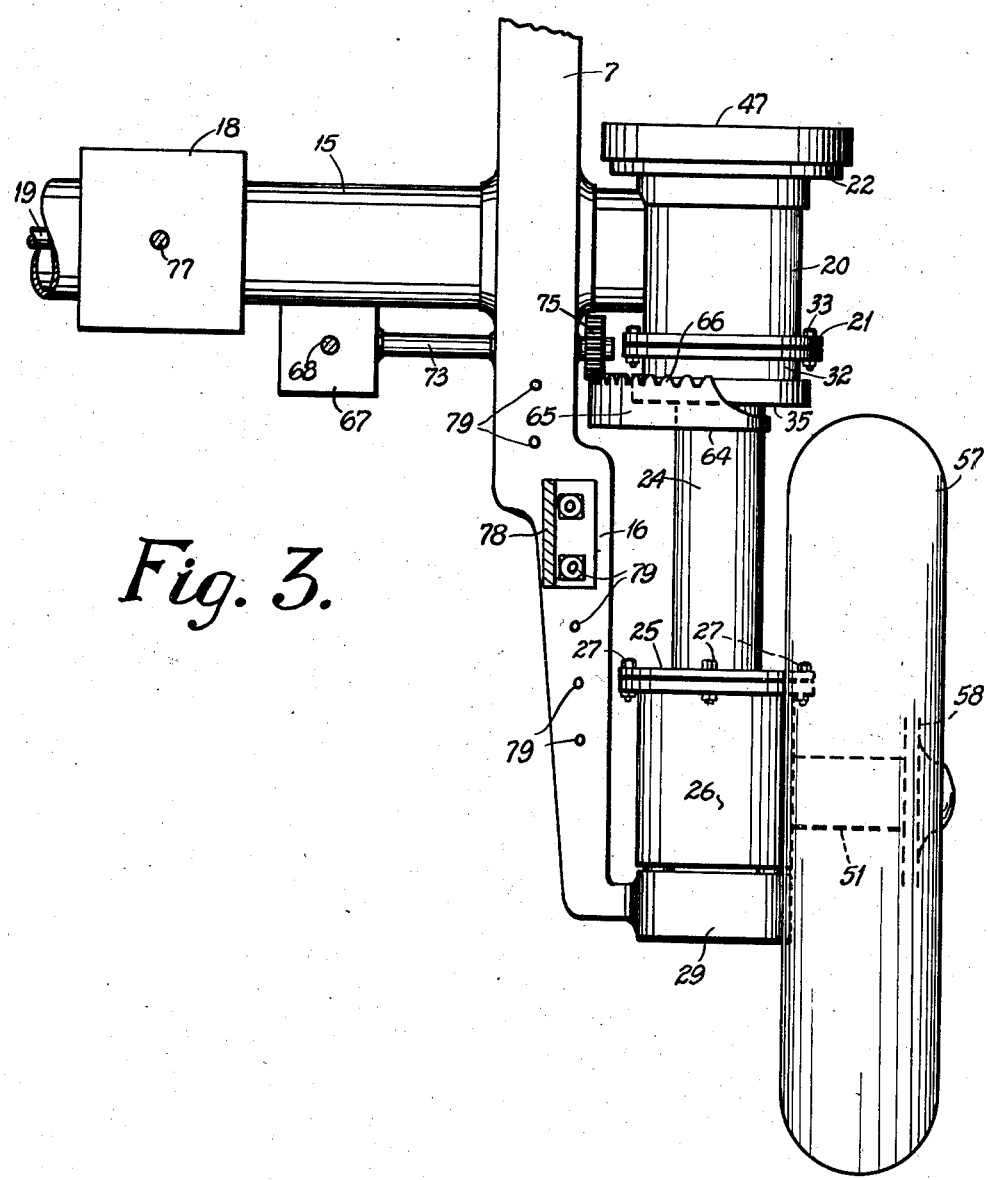
Figure 3 is a rear elevation on an enlarged scale of the right hand, frontal wheel assembly, the left hand portion of the axle and the upper portion of the frontal chassis upright being broken away.

In constructing the plow tractor in accordance with the embodiment represented in the drawings, a suitable frame or chassis is provided, such as here represented generally at 5, the same comprising a pair of laterally spaced and longitudinally extended side members 6 elevated upon corner uprights 7 preferably integrally formed with the horizontal members 6, and all being formed of channel iron or steel for the sake of strength. This frame or chassis includes the upper reinforcing cross-braces 8, and the side braces 9. Any additional bracing as desired may of course be added and incorporated upon the chassis in conventional manner. A cross plate or beam 10 transversely connects the lower ends of the rear uprights 7, and an angular wheel fork 11 is journaled by its central shank perpendicularly and medially into the under side of this cross beam 10, said shank being supported as indicated at 12, upon the vertical leg or bracket 10a medially pendant from the beam 10. A swivel wheel 13 is journaled within the forks of the element 11. A seat and foot rest unit 14 is mounted medially upon the cross beam 10.

A frontal, hollow axle beam or housing 15 connects the lower ends of the frontal uprights 7, the said beam being passed at its ends through the uprights at each side, and these uprights being extended downward below the beam 15 at each side, as indicated at 16. A conventional differential unit 17 is mounted within a housing 18 formed medially in the hollow axle beam 15, and transversely aligned drive shafts 19 are operatively connected with this differential in a conventional manner, the said shafts being journaled laterally through the sides of the housing 18 and extended axially to each side thereof, along through the hollow axle beam 15. An auxiliary gear housing 20 is mounted at each end of the axle housing 15, being preferably integrally formed therewith and being open at its upper and lower ends and being laterally flanged at these ends as indicated at 21, 22, the upper flanging 22 including an upstanding flange 23. An auxiliary axle or drive shaft housing 24 is depended vertically and axially from the lower end of the housing 20, both of these said housings being cylindrical in form for the purpose of rotatably mounting the housing 24, in manner to be pointed out. The lower end of the cylindrical housing 24 is outwardly flanged, as at 25, and is thereby adapted to seat upon a complementally flanged lower gear housing 26, to which it is marginally secured by means of bolts 27. The lower end of the housing 26 is formed with a central and inset socket 28, this inset socket portion of the housing 26 being adapted to rotatably seat within a complemental socket or receptacle 29 formed on the horizontally turned lower end of the pendant lower extension 16 of the frontal uprights 7, it being understood of course that the described structures are to be duplicated at each side of the tractor. Roller bearings 30 are mounted between the adjacent margins of the inner and outer sockets, and the housings 24 and 26 are vertically supported relative to the housing 20 by the bottom wall of the outer socket 29 and by the roller bearings 30 which are vertically positioned thereon, and upon the upper ends of which the horizontal walls of the inset sockets 28 have a bearing. Sufficient lubricating oil is carried in the socket 29 to substantially eliminate friction and wear on the parts. Interiorly of the housing 20 an annular oil trough 31 is supported upon the walls of the housing for a use later pointed out. An annular roller bearing housing 32 formed around its upper side with an outwardly offset flange, is secured by this flange to the lower end of the housing 20 by means of bolts 33 passed through said flange and the flange 21 of the housing 20. The auxiliary drive shaft housing 24 is formed at its upper end with the upper, annular and horizontally disposed bearing-roller guide-way 34, and immediately thereunder another similar guide-way 35, the guide-way 34 being disposed immediately under the oil trough 31 which serves as an upper cover therefor, and the guide-way 35 being inclosed outwardly by means of the housing 32. Roller bearings 36 are mounted horizontally within the guide-way 34, and similar roller bearings 37 are mounted vertically within the guide-way 35, whereby the housing 24 is rotatably supported at its upper end and at the same time is held by the said roller bearings against lateral or vertical movement. As before stated, these structures are of course duplicated at each side of the machine.

Figure 4:
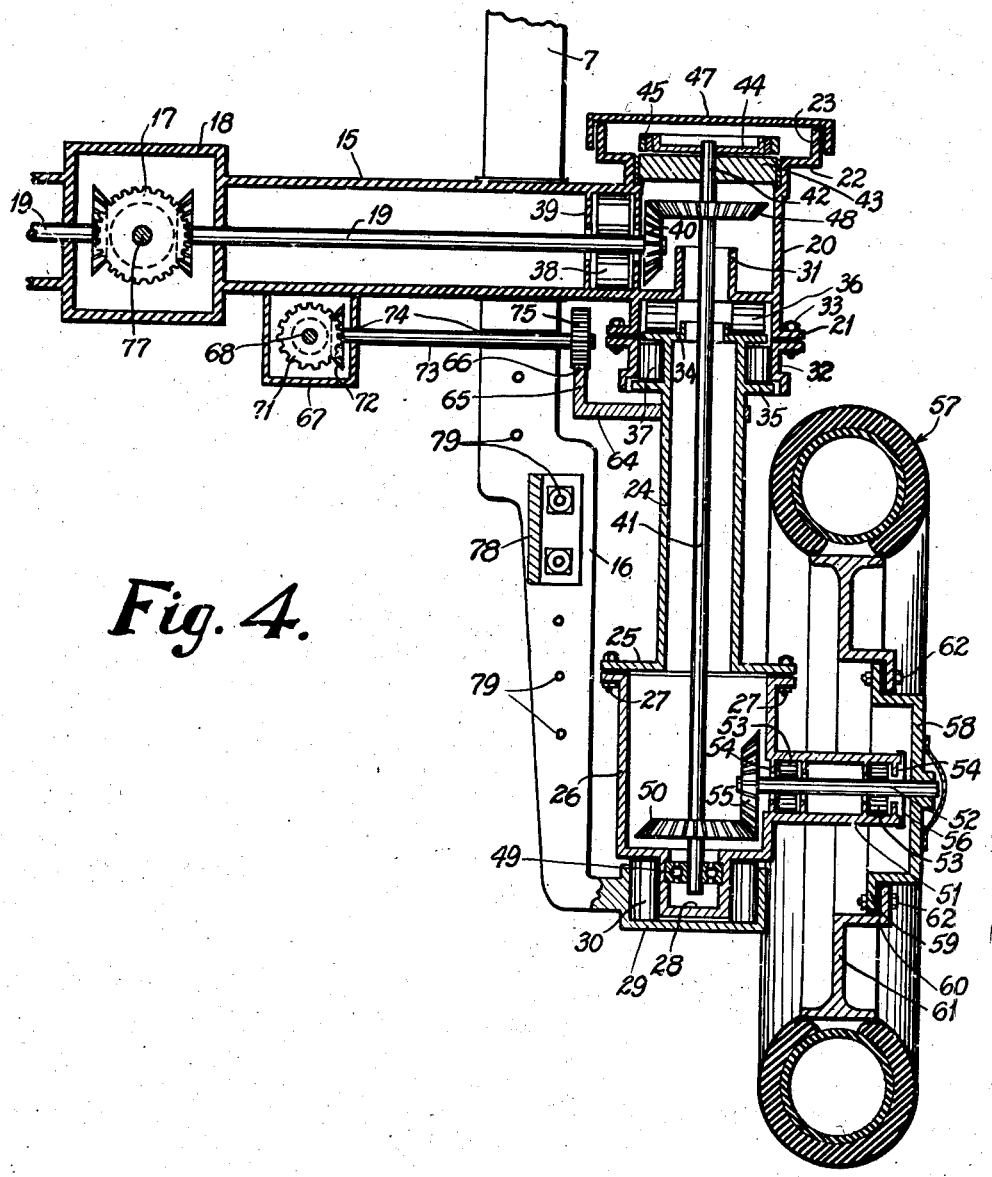
Figure 4 is a medial, vertical section through the asesmbly shown in Figure 3.

The drive shafts 19 at each side are extended into the gear housings 20, being rotatably supported upon roller bearings 38 positioned around the ends of the shafts within the outer ends of the hollow and cylindrical axle beam 15, said bearings being freely confined in place by the annular webs 39 extended from the inner walls of the beam or housing 15. Bevel gears 40 are rigidly anchored at the outer ends of the shafts 19, within the housings 20. Auxiliary drive shafts 41 are extended medially through the vertically aligned housings 20, 24, 26, the upper ends thereof being journaled at 42 through cover plates 43 mounted in the upper ends of the housings 20. Brake drums 44 are rigidly anchored to the upper ends of the shafts 41 above the plates 43, and brake bands 45 encircle these drums and are adapted to tighten thereon for braking purposes by means of toggle levers (not shown), in a conventional manner, the said levers being extended back to the operator's seat 14. Cover plates 47 are provided for the upper sides of the housings 20, these plates being spaced above the plates 43 and the drums 44, and bearing upon the upstanding flanges 23, whereon they may be secured in any conventional manner. Bevel gears 48 are rigidly anchored on the upper ends of the shafts 41, within the housings 20, and are placed in mesh with the similar gears 40 of the drive shafts 19. The lower ends of the shafts 41 are equipped with the ball bearing units 49 of usual form and located within the sockets 28 of the lower housings 26. Immediately above the units 49 and within the lower ends of the housings 26, bevel gears 50 are rigidly anchored upon the shafts 41. Pinion shaft or spindle housings 51 are extended laterally outward from the housings 26, the same opening inwardly thereinto and being preferably integrally formed therewith for the sake of strength and rigidity. Short pinion shafts 52 are extended axially through these housings 51, being rotatably seated in and supported by roller bearings 53 which are held in place by the annular webs 54 extended from the walls of the housings 51, at the ends thereof. Pinion bevel gears 55 are rigidly anchored on the inner ends of the shafts 52, within the housings 26, and are placed in mesh with the bevel gears 50 therein. Cover caps 56 are provided for the outer ends of the housings 51. Tractor wheels 57 are removably keyed upon the outer extended ends of the shafts 52. As here shown these wheels are formed with hub portions 58 having inset annular flanges 59 to meet the complementally outset annular flanges 60 of the rims 61, these parts being then secured together by means of bolts 62 passed through the overlapped flanges 59 and 60, as shown in Figure 4. By varying the off-set of these flanges 59 and 60, the width of tread of tractor wheels may be correspondingly varied, thus adapting the tractor for working in crop rows of various widths.

A steering wheel bracket 64 is welded or otherwise rigidly secured to the inner side of the drive shaft housing 24, below the housing 32, at one side of the differential housing 18 as selected for the purpose. This bracket is arcuate in form, is disposed horizontally, and partially embraces the housing, the curvature of its outer margin being concentric with the auxiliary drive shaft 41. A correspondingly curved web 65, preferably formed integrally with the bracket, is extended vertically upon along the outer curved margin thereof, being thus likewise disposed concentric with the shaft 41. The upper edge of the web 65 is formed with a rack of teeth 66. A steering gear housing 67 is depended at the under side of the beam 15 and adjacent to the bracket 64, and a steering rod 68 is journaled therethrough from front to back, this rod being extended rearwardly and journaled in a bracket 69 depended medially from the overhead structure of the chassis, and a steering wheel 70 is mounted upon the rear end of the rod 68 and disposed conveniently in front of the operator's seat. A bevel gear 71 is rigidly anchored to the forward end of the rod 68, within the housing 67, and is placed in mesh with a similar bevel gear 72 mounted on a steering shaft 73 journaled laterally through the housing 67 and through the adjacent pendant portion 16 of the upright 7 at that side of the tractor, as indicated at 74 in Figure 4. A spur gear 75 is rigidly seated on the outer end of the shaft 73, and is placed in mesh with the arcuate rack 66 of the bracket 64 at that side of the tractor. Thus rotation of the steering wheel 70 will rotate the auxiliary drive shaft housing 24, for turning the wheels 57 angularly to either side, in the process of steering the tractor as desired.

A conventional form of internal combustion engine 76 is mounted in the chassis, immediately back of the differential unit 17, and the drive shaft 77 thereof is operatively connected with this differential, as shown, the said differential being of any conventional form. Draw bars 78 are attached at their forward ends at each side of the tractor to any selected ones of the series of bolt holes 79 in any conventional manner, these said holes being located in the pendant lower ends 16 of the forward uprights 7. The draw bars 78 are connected at their rear ends with the plows 80 in any suitable manner, and these bars are curved horizontally inward as shown, to accommodate the inward swing of the front wheels 57 in turning the tractor. The holes 79 are located above a horizontal plane passed through the pinion shafts 52, so that the drag or pull of the plows 80 will tend to stabilize the tractor against any danger of toppling forward, especially when plowing down-grade. Any suitable means (not shown) may be provided for raising or lowering the plows, or other implements such as might be mounted on the tractor in lieu thereof, such as disc harrows, scrapers or the like (not shown).

A farm tractor constructed in the manner described possesses many advantages over other or standard makes of tractors for the same purposes. The working of the plows or other implements is always in full view of the operator and under his full and positive control, thus enabling the operator to steer the plows close to the crop rows as desired or close to fences; and the tractor wheels may be turned so sharply to either side as to enable turning the machine around in very short space. The mounting of the engine at the front axle ensures ample tractive power to the steerable front wheels, to positively carry the tractor in any direction desired and to which it may be steered. The arrangement of the draw bars at each side serve to maintain the plows or other implements steadily to their straight-forward operative positions. The oil troughs and sockets as described for the gears and roller bearings, ensure perfect lubrication of these parts. While certain of the advantages of this form of tractor are here referred to specifically, other and additional advantages are inherent in the structural features shown and necessarily follow therefrom, it not being considered necessary to specifically dwell upon each separately.

It is thought that the construction and operation of the tractor as made in accordance with this invention will be fully understood from the foregoing description, and while I have here shown a particular embodiment of the machine, the several structures as shown may be changed or varied as desired, within the scope of the appended claims.

I claim:

1. In a tractor of the kind described, a wheel borne chassis, including a frontal hollow axle housing, upper gear housings anchored upon the ends of the said housing, the same being open at their upper and lower ends, auxiliary drive shaft housings vertically and rotatably supported below and in axial alignment with the upper gear housings, lower gear housings anchored at the lower ends of the drive shaft housings in axial alignment therewith, the same being closed at their lower ends, spindle housings anchored horizontally upon the outer sides of the lower gear housings, a differential unit mounted medially within the frontal hollow axle housing, transversely and axially aligned drive shafts operatively connected at their inner ends with this differential unit and journaled axially through the axle housing at each side of the differential unit, the outer ends of these shafts being extended into the said upper gear housings, bevel gears keyed upon the outer ends of the drive shafts within the upper gear housings, auxiliary drive shafts journaled medially down through the aligned housings, the upper ends thereof being journaled through cover plates in the upper ends of the upper gear housings and the lower ends thereof being disposed within the lower gear housings, brake drums anchored to the upper ends of the auxiliary drive shafts above the cover plates, brake bands encircling these drums, bevel gears keyed upon the upper ends of the auxiliary drive shafts within the upper gear housings and in mesh with the similar gears at the ends of the primary drive shafts, bevel gears keyed upon the lower ends of the auxiliary drive shafts within the lower gear housings, spindle shafts journaled through the said spindle housings, pinion bevel gears rigidly keyed upon the inner ends of the spindle shafts in mesh with the bevel gears at the lower ends of the auxiliary drive shafts, tractor wheels mounted upon the outer extended ends of the spindle shafts, and means for steering the frontal wheels laterally as desired.

2. In a tractor constructed according to claim 1, the said steering means comprising an arcuate rack supported upon the inner side of one of the vertically disposed auxiliary and rotatable drive shaft housings and concentrically therewith, a steering gear housing upon the frontal axle housing, a steering shaft journaled at its inner end laterally through the housing and extended outwardly adjacent the said arcuate rack and rotatably journaled and supported thereat, a gear keyed upon the outer end of the steering shaft in mesh with the said arcuate rack, a bevel gear keyed upon the inner end of the steering shaft within the said steering gear housing, a steering rod journaled at its forward end through the rear side of the steering gear housing, a bevel gear keyed upon the said forward end of the steering rod within the said housing, the said steering rod being extended and journaled rearwardly and provided with a steering wheel.

3. In a tractor of the kind described, a wheelborne chassis including overhead and longitudinally extended and laterally spaced side members supported upon corner uprights and suitably braced, and including a frontal, hollow axle housing passed at its ends medially through the uprights at each side, thus providing pendant portions of said uprights below the axle housing, the lower ends of these pendant portions being turned horizontally outward at each side to provide housing supporting elements, upper gear housings anchored upon the ends of the axle housing the same being open at their upper and lower ends, auxiliary cylindrical drive shaft housings vertically and rotatably supported upon the outwardly extended housing supports at the lower ends of the pendant portions of the frontal uprights, in axial alignment with the upper gear housings, spindle housings anchored horizontally upon the outer sides of the lower ends of the cylindrical drive shaft housings, a differential unit mounted medially within the frontal axle housing, drive shafts operatively connected at their inner ends with the differential unit at each side thereof and journaled through the axle housing with their outer ends extended into the upper gear housings, bevel gears keyed upon the ends of these drive shafts within the upper gear housings, auxiliary drive shafts journaled medially down through the vertically aligned upper gear housings and auxiliary cylindrical and rotatable drive shaft housings, bevel gears keyed upon the upper ends of the auxiliary drive shafts in mesh with the similar gears at the ends of the primary drive shafts, bevel gears keyed upon the lower ends of the auxiliary drive shafts, spindle shafts journaled through the said spindle housings, pinion bevel gears keyed upon the inner ends of the spindle shafts in mesh with the bevel gears at the lower ends of the auxiliary drive shafts, and tractor wheels mounted upon the outer extended ends of the spindle shafts.

4. In a tractor of the kind described and embodying a wheel-borne chassis including frontal corner uprights and a frontal axle housing passed at its ends medially through the uprights at each side, thus providing pendant lower portions of said uprights below the axle housing, the lower ends of these pendant portions being turned horizontally outward as housing supports, upper gear housings mounted upon the ends of the axle housing, the same being open at their upper and lower sides, auxiliary cylindrical drive shaft housings having lower gear housings rigidly mounted upon their lower ends, the latter being rotatably journaled and supported upon the outturned housing supports of the lower ends of the uprights and the auxiliary drive shaft housings being vertically aligned with the upper gear housings and rotatably supported in that relation, spindle housings anchored to and extended perpendicularly from the outer sides of the lower gear housings, a differential unit mounted medially within the frontal axle housing, drive shafts operatively connected at their inner ends at each side of the differential unit and journaled oppositely through the axle housing with their outer ends disposed within the upper gear housings, auxiliary drive shafts journaled down through the vertically aligned upper gear housings, drive shaft housings and lower gear housings, spindle shafts journaled through the spindle housings, tractor wheels mounted upon the outer extended ends of the spindle shafts, and gear connections between the adjacent ends of the several shafts whereby rotation of the drive shafts of the axle housing will in turn rotate the auxiliary drive shafts, the spindle shafts and the tractor wheels.

5. In a steerable front wheel drive assembly according to claim 4, means for steering the vehicle laterally, same comprising an arcuate rack upon the inner side of one of the vertical and rotatable auxiliary drive housings concentric with the drive shaft therein, a steering shaft journaled upon the frontal axle housing, gears upon the ends of the steering shaft with the outer gear in mesh with the said rack, a steering rod journaled in the chassis perpendicularly to the said steering shaft and extended rearwardly, and a gear at the forward end of the steering rod in mesh with the gear at the inner end of the steering shaft.

EMORY W. COLE.